US010613379B2

(12) United States Patent
Yang et al.

(10) Patent No.: US 10,613,379 B2
(45) Date of Patent: Apr. 7, 2020

(54) BACKLIGHT DRIVING CONTROL METHOD AND SYSTEM

(71) Applicant: SHENZHEN TCL NEW TECHNOLOGY LTD., Shenzhen, Guangdong (CN)

(72) Inventors: Fujun Yang, Shenzhen (CN); Renli Xie, Shenzhen (CN); Jian Wang, Shenzhen (CN)

(73) Assignee: SHENZHEN TCL NEW TECHNOLOGY LTD., Shenzhen (CN)

( * ) Notice: Subject to any disclaimer, the term of this patent is extended or adjusted under 35 U.S.C. 154(b) by 11 days.

(21) Appl. No.: 16/063,831

(22) PCT Filed: Jun. 2, 2016

(86) PCT No.: PCT/CN2016/084466
§ 371 (c)(1),
(2) Date: Jun. 19, 2018

(87) PCT Pub. No.: WO2017/107387
PCT Pub. Date: Jun. 29, 2017

(65) Prior Publication Data
US 2018/0373095 A1 Dec. 27, 2018

(30) Foreign Application Priority Data
Dec. 23, 2015 (CN) .......................... 2015 1 0979890

(51) Int. Cl.
*G02F 1/133* (2006.01)
*G02F 1/1335* (2006.01)
(Continued)

(52) U.S. Cl.
CPC ...... *G02F 1/133603* (2013.01); *G02F 1/1343* (2013.01); *G02F 1/13306* (2013.01);
(Continued)

(58) Field of Classification Search
CPC ........... G02F 1/133603; G02F 1/13306; G02F 1/1343; G09G 3/2011; G09G 3/3406;
(Continued)

(56) References Cited

U.S. PATENT DOCUMENTS 6,531,835 B2  3/2003 Chen et al.
2002/0075223 A1  6/2002 Chen et al.
(Continued)

FOREIGN PATENT DOCUMENTS

CN  101179891  5/2008
CN  101426313  5/2009
(Continued)

OTHER PUBLICATIONS

International Search Report dated Sep. 19, 2016 from corresponding application No. PCT/CN2016/084466.
(Continued)

*Primary Examiner* — Tom V Sheng
(74) *Attorney, Agent, or Firm* — Hauptman Ham, LLP

(57) ABSTRACT

Disclosed is a backlight driving control method and system applied to a display terminal having an LCD. The display terminal includes a MCU and a backlight, the backlight includes multiple light bars composed of LED lights and multiple driving ICs, each driving IC controls one or more light bars. The method includes: in response to reception of respective electrical signals of the LED lights, demodulating, by the MCU, the electrical signals to obtain respective brightness values of the LED lights; comparing the respective brightness values of the LED lights in each driving IC to obtain a maximum brightness value of the LED lights in the driving IC; and dividing the maximum brightness values of the LED lights in the driving ICs into multiple brightness intervals, determining a current value corresponding to each brightness interval, and controlling the brightness of the
(Continued)

LED lights in the driving ICs according to the current values.

12 Claims, 5 Drawing Sheets

(51) Int. Cl.
    *G09G 3/34*           (2006.01)
    *G09G 3/20*           (2006.01)
    *H05B 45/10*         (2020.01)
    *G02F 1/1343*       (2006.01)
    *G09G 3/36*           (2006.01)

(52) U.S. Cl.
    CPC ........... *G09G 3/2011* (2013.01); *G09G 3/342* (2013.01); *G09G 3/3648* (2013.01); *H05B 45/10* (2020.01); *G09G 2320/0626* (2013.01); *G09G 2320/0633* (2013.01); *G09G 2360/16* (2013.01)

(58) Field of Classification Search
    CPC .... G09G 3/342; G09G 3/3426; G09G 3/3648; G09G 2320/0233; G09G 2320/0626; G09G 2320/0633; G09G 2320/0646; G09G 2330/021; G09G 2360/16; H05B 33/0845
See application file for complete search history.

(56) References Cited

U.S. PATENT DOCUMENTS

| | | | |
|---|---|---|---|
| 2009/0033611 A1* | 2/2009 | Mizumaki | B60K 35/00 345/102 |
| 2011/0050654 A1* | 3/2011 | Tsutsui | H05K 1/0203 345/204 |
| 2011/0050668 A1 | 3/2011 | Park et al. | |
| 2011/0134158 A1 | 6/2011 | Onishi | |
| 2012/0320105 A1* | 12/2012 | Ueno | G09G 3/3426 345/690 |
| 2013/0015770 A1* | 1/2013 | Aitken | G09G 3/3406 315/154 |
| 2013/0027438 A1* | 1/2013 | Hu | G09G 3/3413 345/690 |
| 2013/0093802 A1* | 4/2013 | Tanaka | G09G 3/003 345/690 |
| 2013/0265348 A1* | 10/2013 | Onogi | G09G 5/10 345/691 |
| 2014/0132891 A1* | 5/2014 | Tohyama | G02F 1/133603 349/69 |
| 2014/0217912 A1* | 8/2014 | Lin | H05B 33/0812 315/209 R |
| 2014/0247295 A1* | 9/2014 | Hussain | G09G 3/3611 345/691 |
| 2014/0333204 A1* | 11/2014 | Zhang | G09G 3/00 315/119 |
| 2014/0340295 A1* | 11/2014 | Zhang | H05B 33/0809 345/102 |
| 2015/0116379 A1 | 4/2015 | Lim | |
| 2015/0228250 A1* | 8/2015 | Chen | G09G 5/10 345/690 |
| 2015/0359051 A1* | 12/2015 | Chu | H05B 33/0845 315/188 |
| 2016/0113085 A1* | 4/2016 | Vaananen | H05B 33/0851 315/185 R |
| 2016/0335957 A1* | 11/2016 | Fu | G09G 3/2018 |

FOREIGN PATENT DOCUMENTS

| | | |
|---|---|---|
| CN | 102298908 | 12/2011 |
| CN | 105405412 | 3/2016 |
| JP | 2002324685 | 11/2002 |

OTHER PUBLICATIONS

European Search Report dated Jul. 23, 2019 from corresponding European Application No. 16877201.0.

\* cited by examiner

BACKLIGHT DRIVING CONTROL METHOD AND SYSTEM

RELATED APPLICATIONS

The present application is a National Phase of International Application Number PCT/CN2016/084466, filed Jun. 2, 2016, and claims the priority of China Application No. 201510979890.X, filed Dec. 23, 2015.

TECHNICAL FIELD

This disclosure relates to the field of display technology, and more particularly to a backlight driving control method and system.

BACKGROUND

Nowadays, more and more Liquid Crystal Display (LCD) color televisions (TVs) use Light Emitting Diode (LED) backlighting technology. Advantages of LCD color TVs using LED backlighting technology are long service life, energy saving, and convenient driving. There are two typical LED backlighting schemes. One is of a direct type, where a number of lights are placed directly under the screen. The other is of an edge type, where a number of lights are distributed around the screen and the light is evenly guided to the LCD screen through a light guide plate. Both of the above LED backlighting schemes are widely used, but the direct type has more advantages. Its primary advantage is the ability to enable the Local Dimming function. The so-called Local Dimming is to divide the lights behind the screen into multiple groups, such as 32 groups, 64 groups, or 128 groups. Each group is composed of several lights in series. Generally, the greater the number of groups and the finer the grouping, the better the dimming effect. The brightness of each group of lights is determined by the brightness of the picture, thereby enabling better display effects and making it more energy-saving.

Typical Local Dimming generally adjusts the brightness by way of adjusting both a Pulse Width Modulation (PWM) and a reference current of the LEDs. This however requires that each channel of a driving Integrated Circuit (IC) must be able to adjust the reference current and the duty cycle at the same time. In this case, a digital-to-analog converter is required for each channel of the driving IC, resulting in a high production cost of the driving IC. Thus, the current method of controlling the brightness is using a fixed maximum current and then adjusting the PWM according to this current. When using this method, however, the corresponding voltage will also increase when the LED current increases. Accordingly, the lighting efficacy of the LED lights will be reduced, which is not conducive to energy saving and increasing the contrast of the displayed picture.

SUMMARY

It is therefore one primary object of this disclosure to provide a backlight driving method and system, aiming to solve the technical problem of a poor lighting efficacy which is not conducive to energy saving as well as a poor picture display contrast of the existing backlight driving control method.

To achieve the above object, this disclosure provides a backlight driving control method applied to a display terminal having a liquid crystal display. The display terminal includes a micro control unit (MCU) and a backlight. The backlight includes multiple light bars formed by LED lights as well as multiple driving ICs. The MCU is electrically connected to the driving ICs and is configured to send electrical signals to the driving ICs. Each driving IC controls one or more light bars. The backlight driving control method includes the following operations. In response to reception of respective electrical signals of the LED lights, the MCU demodulates the respective electrical signals of the LED lights to obtain respective brightness values of the LED lights. Then the respective brightness values of the LED lights in each of the driving ICs are compared with each other to obtain the maximum brightness value of the LED lights in each driving IC. Then the maximum brightness values of the LED lights in the driving ICs are divided into multiple brightness intervals, and a current value corresponding to each brightness interval is determined according to a mapping relationship between each brightness interval and a preset current value. The brightness of the LED lights in the driving ICs is then controlled according to the current values. Then the current values are stored in the driving ICs. The LED lights on every two light bars share one driving IC.

In some embodiments, the block of comparing the respective brightness values of the LED lights in each of the driving ICs with each other to obtain the maximum brightness value of the LED lights in each driving IC includes the following operations. The respective brightness values of the LED lights on each light bar are compared with each other to obtain a maximum brightness value of the LED lights on the same light bar. Then the maximum brightness values of the LED lights on two light bars that share one of the driving IC are compared with one another. From among the maximum brightness values of the two light bars that share the one of the driving ICs the larger maximum brightness value is selected as the maximum brightness value of the LED lights in this one of the driving ICs, so as to obtain the maximum brightness value of the LED lights in each of the driving ICs.

In some embodiments, the LED lights on a same light bar common anode connect.

In addition, to achieve the above object, this disclosure further provides a backlight driving control method applied to a display terminal having a liquid crystal display. The display terminal includes a micro control unit (MCU) and a backlight. The backlight includes multiple light bars formed by LED lights as well as multiple driving ICs. The MCU is electrically connected to the driving ICs and is configured to send electrical signals to the driving ICs. Each driving IC controls one or more light bars. The backlight driving control method includes the following operations. In response to reception of respective electrical signals of the LED lights, the MCU demodulates the respective electrical signals of the LED lights to obtain respective brightness values of the LED lights. Then the respective brightness values of the LED lights in each of the driving ICs are compared with each other to obtain the maximum brightness value of the LED lights in each driving IC. Then the maximum brightness values of the LED lights in the driving ICs are divided into multiple brightness intervals, and a current value corresponding to each brightness interval is determined according to a mapping relationship between each brightness interval and a preset current value. The brightness of the LED lights in the driving ICs is then controlled according to the current values.

In some embodiments, the LED lights on every two light bars share one driving IC.

In some embodiments, the block of comparing the respective brightness values of the LED lights in each of the driving ICs with each other to obtain the maximum brightness value of the LED lights in each driving IC includes the following operations. The respective brightness values of the LED lights on each same light bar are compared with each other to obtain a maximum brightness value of the LED lights on the same light bar. Then the maximum brightness values of the LED lights on two light bars that share one of the driving ICs are compared with one another. From among the maximum brightness values of the two light bars that share the one of the driving ICs the larger maximum brightness value is selected as the maximum brightness value of the LED lights in this one of the driving ICs, so as to obtain the maximum brightness value of the LED lights in each of the driving ICs.

In some embodiments, the backlight driving control method further includes the following operation, subsequent to the block of dividing the maximum brightness values of the LED lights in the driving ICs into multiple brightness intervals, and determining a current value corresponding to each brightness interval according to a mapping relationship between each brightness interval and a preset current value, and controlling the brightness of the light bars connected to the driving ICs according to the current values: storing the current values in the driving ICs.

In some embodiments, the LED lights on a same light bar common anode connect.

In addition, to achieve the above object, this disclosure further provides a backlight driving control system applied to a display terminal having a liquid crystal display. The display terminal includes a micro control unit (MCU) and a backlight. The backlight includes multiple light bars formed by LED lights as well as multiple driving ICs. The MCU is electrically connected to the driving ICs and is configured to send electrical signals to the driving ICs. Each driving IC controls one or more light bars. The backlight driving control system includes: a demodulating module configured to, in response to reception of respective electrical signals of the LED lights, demodulate the respective electrical signals of the LED lights to obtain respective brightness values of the LED lights; a comparing module configured to compare the respective brightness values of the LED lights in each of the driving ICs with each other to obtain the maximum brightness value of the LED lights in each of the driving ICs; and a control module configured to divide the maximum brightness values of the LED lights in the driving ICs into multiple brightness intervals, and determine a current value corresponding to each brightness interval according to a mapping relationship between each brightness interval and a preset current value, and then control the brightness of the LED lights in the driving ICs according to the current values.

In some embodiments, the LED lights on every two light bars share one driving IC.

In some embodiments, the comparing module includes: a first comparing unit configured to compare the respective brightness values of the LED lights on each light bar with each other to obtain a maximum brightness value of the LED lights on the same light bar; and a second comparing unit configured to compare the maximum brightness values of the LED lights on two light bars that share one of the driving ICs with one another, select the larger maximum brightness value as the maximum brightness value of the LED lights in this one of the driving ICs from among the maximum brightness values of the two light bars that share the one of the driving ICs, so as to obtain the maximum brightness value of the LED lights in each of the driving ICs.

In some embodiments, the backlight driving control system further includes a storage module configured to store the current values into the driving ICs.

In some embodiments, the LED lights on a same light bar common anode connect.

According to this disclosure, the respective brightness values of the LED lights are obtained based on the received respective electrical signals of the LED lights. Then the maximum brightness value of the LED lights in each driving IC is obtained based on the respective brightness values of the LED lights in the driving IC. The maximum brightness values of the LED lights in these driving ICs are then divided into brightness intervals, and the current values corresponding to these brightness intervals are then determined. Thus, the brightness of the LED lights in these driving ICs is then controlled according to these current values. Compared with the existing Local Dimming which adjusts the brightness by way of adjusting the PWM duty ratio and the LED reference current at the same time, the present disclosure adjusts the PWM duty ratio to adjust the LED reference current thus achieving the purpose of adjusting the brightness. Therefore, the energy-saving effect for the local dimming driving and the contrast of the picture display are improved without increasing the cost.

BRIEF DESCRIPTION OF THE ACCOMPANYING DRAWINGS

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It will be understood that the specific embodiments described herein are merely illustrative of the disclosure and are not intended to limit the disclosure.

The present disclosure provides a backlight driving control method.

Figure 1:
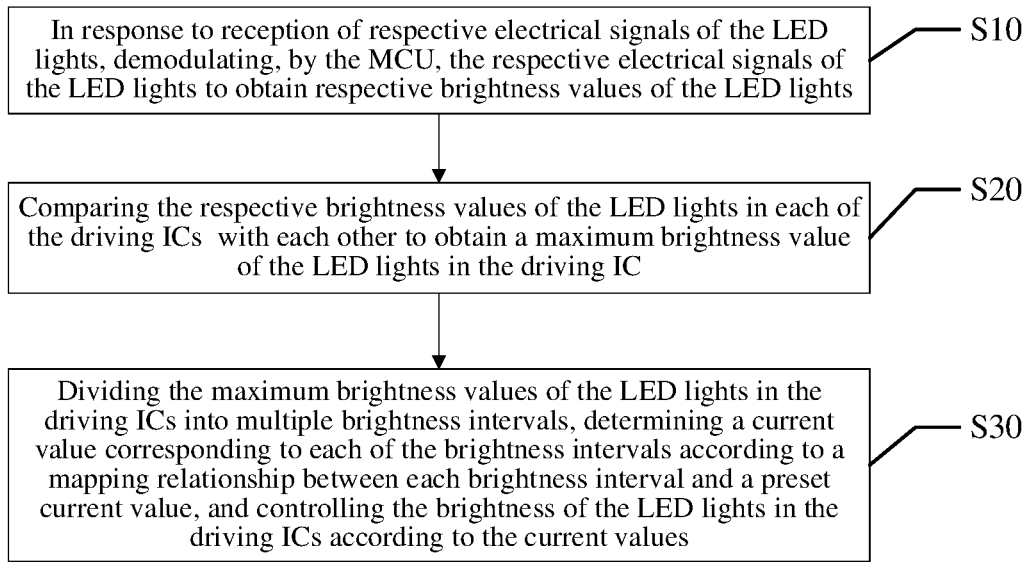
FIG. 1 is an illustrative flowchart of a first embodiment of a backlight driving control method in accordance with this disclosure.

As illustrated in FIG. 1, there is shown an illustrative flowchart of a first embodiment of a backlight driving control method in accordance with this disclosure.

Figure 8:
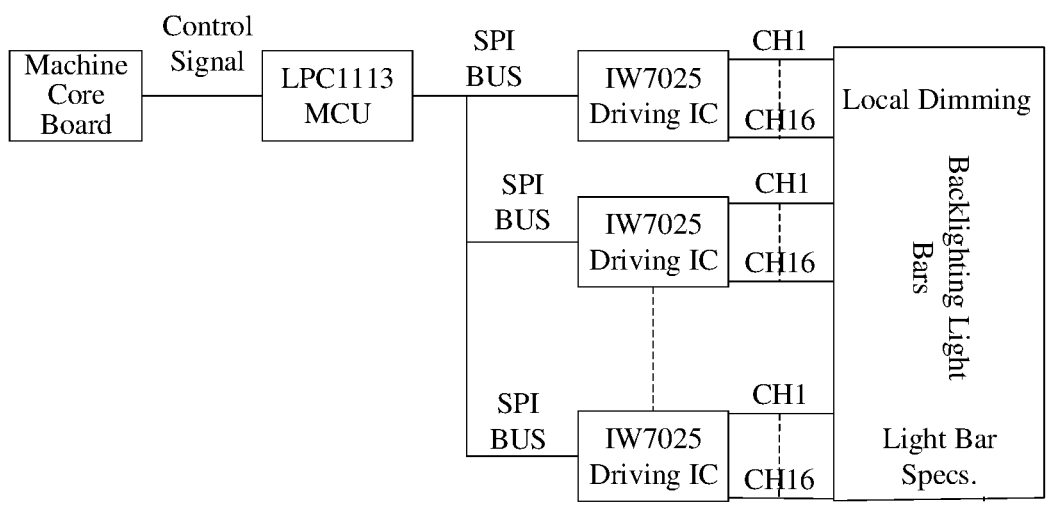
FIG. 8 is a schematic diagram illustrating the structure of a Local Dimming driving board in accordance with an embodiment of this disclosure.
Figure 9:
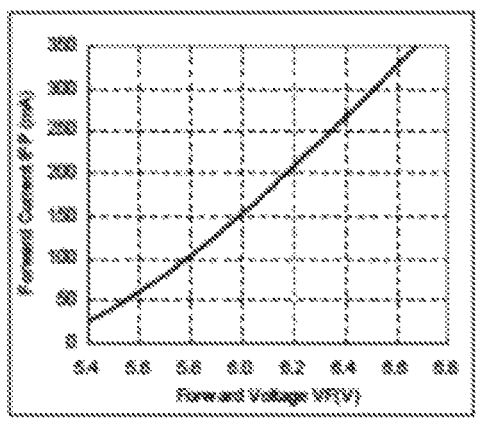
FIG. 9 is a schematic graph illustrating a relationship between a forward voltage and a forward current in accordance with an embodiment of this disclosure.
Figure 10:
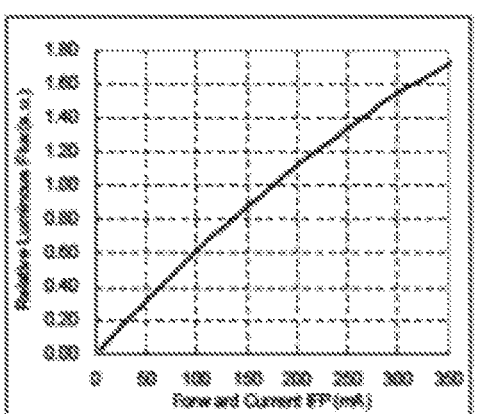
FIG. 10 is a schematic graph illustrating a relationship between a forward current and a brightness value of an LED light in accordance with an embodiment of this disclosure.

The backlight driving control method is applied to a display terminal having a liquid crystal display. The display terminal includes a micro control unit (MCU) and a backlight. The backlight includes multiple light bars formed by LED lights as well as multiple driving ICs. The MCU is electrically connected to the driving ICs and is configured to send electrical signals to the driving ICs. Each driving IC controls one or more light bars. As illustrated in FIG. 8, there is shown a schematic diagram illustrating the structure of a Local Dimming driving board in accordance with an embodiment of this disclosure. As can be seen from FIG. 8, in the Local Dimming driving board, the MCU (Micro Control Unit, also called a single-chip microcomputer or an SCM) receives picture signals sent from the machine core board via the SPI (Serial Peripheral Interface) bus. When receiving the picture information, the MCU decodes the picture signals to obtain the light and dark configuration of the LED backlight, and the controls the state of each of the LED lights in each channel of the driving ICs. In this disclosure, the MCU is an LPC1113, but the MCU includes without limitation the LPC1113. The driving ICs are 16-channel, and the CH1-CH16 depicted in FIG. 8 represent the first channel through the sixteenth channel of a drive IC. Referring now to FIGS. 9 and 10, where FIG. 9 is a schematic graph illustrating a relationship between a forward voltage and forward current in accordance with an embodiment of this disclosure, while FIG. 10 is a schematic graph illustrating a relationship between a forward current and a brightness value of an LED light in accordance with an embodiment of this disclosure. As can be seen from FIG. 9 and FIG. 10, in this disclosure the forward current flowing in the local Dimming driving board increases as the forward voltage increases, and the brightness value of the LED lights in the Local Dimming driving board increases as the forward current increases.

In this embodiment, the backlight driving control method includes the following blocks which begin at S10 and end at S30.

In S10, in response to reception of respective electrical signals of the LED lights, the MCU demodulates the respective electrical signals of the LED lights to obtain respective brightness values of the LED lights.

For the present, almost all televisions use liquid crystal displays. The backlight of the liquid crystal display includes a light bar consisting of LED lights and multiple driving ICs. Each driving IC includes multiple LED lights. Further, one or more light bars share one driving IC. The liquid crystal display includes an MCU that demodulates the machine core board Local Dimming, as well as multiple driving ICs. The MCU-based Local Dimming is mainly composed of three parts, namely, an FPGA (Field Programmable Gate Array) or SOC (System On Chip), and LED driving ICs. When collecting the electrical signals for displaying a picture, the FPGA or the SOC sends the electrical signals to the MCU via the SPI (Serial Peripheral Interface), where the electrical signals are the respective PWM signals of the various LED lights in the LED backlight. Then in response to reception of the respective electrical signals of the various LED lights for displaying a picture, the MCU demodulates the respective electrical signals of the LED lights, namely demodulates the PWM signals, so as to obtain the respective PWM duty ratios of the LED lights. Based on the respective PWM duty ratios of the LED lights, the respective reference current values of the various LED lights in the LED backlight can be obtained; that is, the respective brightness values of the LED lights in the LED backlight source are obtained. The LED lights on each light bar in the LED backlight share one LED light driving IC, and the LED lights on the same light bar common anode connect. The driving IC for the LED lights is generally 8-channel or 16-channel. Each channel corresponds to an LED light, and the LED lights of the 8 channels or of the 16 channels are arranged together. The backlight driving control method then proceeds to block S20.

In S20, the respective brightness values of the LED lights in each of the driving ICs are compared with each other to obtain a maximum brightness value of the LED lights in this driving IC.

The MCU compares the respective brightness values of the LED lights in each of the driving ICs with each other, so as to obtain a maximum value of the brightness of the LED lights in the driving IC in the LED backlight. For example, when there are a total of 192 LED lights in the LED backlight, every 8 LED lights share a light bar, and the 8 LED lights on the same light bar common anode connect. When the driving ICs are 8-channel and one light bar uses one driving IC, then a total of 24 driving ICs would be required. The MCU compares the magnitudes of the brightness values of the 8 LED lights in each driving IC, and then takes the brightness value of the LED light with the largest brightness value in the same driving IC as the maximum brightness value of the LED lights in this driving IC, so as to obtain the maximum brightness value of the LED lights in each of the 24 driving ICs. The backlight driving control method then continues to block S30.

In S30, the maximum brightness values of the LED lights in the driving ICs are divided into multiple brightness intervals, and a current value corresponding to each brightness interval is determined according to a mapping relationship between each brightness interval and a preset current value. The brightness of the LED lights in the driving ICs is then controlled according to the current values.

When it obtains the maximum brightness value of the LED lights in every of the driving ICs in the LED backlight, the MCU arranges the maximum brightness values of the LED lights in these driving ICs from the smallest to the largest. Then based on the size conditions of the arranged maximum brightness value of the LED lights in every of the driving ICs, the MCU divides the maximum brightness values of the LED lights in these driving ICs into multiple brightness intervals. For example, when the maximum brightness values of the LED lights in these driving ICs are arranged relatively compact, the MCU may divide the maximum brightness values of the LED lights in these driving ICs into 3 brightness intervals. Otherwise when the maximum brightness values of the LED lights in these driving ICs are arranged relatively loose, the MCU may divide the maximum brightness values of the LED lights in these driving ICs into 5 brightness intervals. Then based on the mapping relationship between each brightness interval and a preset current value, the MCU determines the current value corresponding to each brightness interval, where the preset current values are current values corresponding to different brightness intervals that are pre-stored by the MCU. The current values and the brightness values of the brightness intervals are in a proportional relationship; that is, the greater the brightness values in a brightness interval, the larger the current value. As such, the MCU controls the brightness of the LED lights in the driving ICs according to the current values, namely controls the brightness of the LED lights in different driving ICs according to the current values of different brightness intervals For example, after it obtains the maximum brightness values of the LED lights in the 24 driving ICs, the MCU arranges the maximum brightness values of the LED lights in the 24 driving ICs in an ascending order, and then divides the maximum brightness values of the LED lights in the 24 driving ICs into 3 brightness intervals based on the arrangement result. That is, from among the maximum brightness values of the LED lights in the 24 driving ICs, a smallest, a middle, and a largest maximum brightness value are selected as boundary values of the brightness intervals, so as to obtain a first brightness interval, a second brightness interval, and a third brightness interval. The brightness value of the LED lights in the first brightness interval is smaller than the brightness value of the LED lights in the second brightness interval, and in turn the brightness value of the LED lights in the second brightness interval is smaller than the brightness value of the LED lights in the third brightness interval. Then based on a mapping relationship between each brightness interval and a preset current value, the MCU determines the current values corresponding to the first brightness interval, the second brightness interval, and the third brightness interval. The current value of the first brightness interval is smaller than the current value of the second brightness interval, and in turn the current value of the second brightness interval is smaller than the current value of the third brightness interval. As such, the MCU controls the brightness of the LED lights in these 24 driving ICs according to the current values of the first brightness interval, the second brightness interval, and the third brightness interval.

In the Local Dimming driving board, a backlight is composed of hundreds of LEDs. The backlight replaces a CCFL (Cold Cathode Fluorescent Lamp) backlight. The backlight LEDs can be adjusted according to the brightness of a picture, so that the brightness of highly bright portions of the displayed picture can reach the maximum, while the brightness of dark portions of the displayed picture can be reduced, or even turned off, in order to achieve the optimum contrast of the displayed picture. Accordingly, the reduction of the brightness of the dim areas reduces the power consumption of the backlight.

According to this embodiment, the respective brightness values of the LED lights are obtained based on the received respective electrical signals of the LED lights. Then the maximum brightness value of the LED lights in each driving IC is obtained based on the respective brightness values of the LED lights in the driving IC. The maximum brightness values of the LED lights in these driving ICs are then divided into brightness intervals, and the current values corresponding to these brightness intervals are then determined. Thus, the brightness of the LED lights in these driving ICs is then controlled according to these current values. Compared with the existing Local Dimming which adjusts the brightness by way of adjusting the PWM duty ratio and the LED reference current at the same time, the present disclosure adjusts the PWM duty ratio to adjust the LED reference current thus achieving the purpose of adjusting the brightness. Therefore, the energy-saving effect for the local dimming driving and the contrast of the picture display are improved without increasing the cost.

Figure 2:
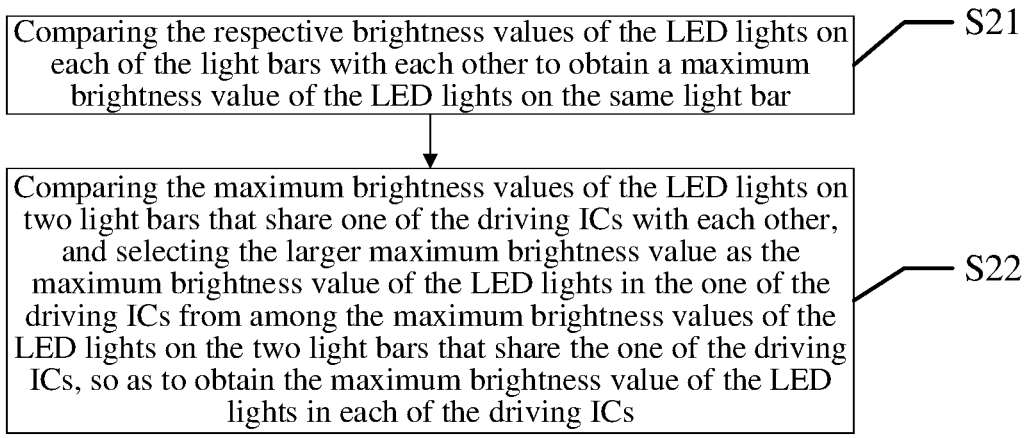
FIG. 2 is a flowchart illustrating the process of comparing the respective brightness values of the LED lights in each of the driving ICs with each other to obtain the maximum brightness value of the LED lights in the driving IC in accordance with an embodiment of this disclosure.

Referring now to FIG. 2, there is shown a flowchart illustrating the process of comparing the respective brightness values of the LED lights in each of the driving ICs with each other to obtain the maximum brightness value of the LED lights in the driving IC in accordance with an embodiment of this disclosure.

In this embodiment, block S20 includes the following operations S21 and S22.

In S21, the respective brightness values of the LED lights on each light bar are compared with each other to obtain a maximum brightness value of the LED lights on the same light bar.

In this embodiment, the LED lights on every two light bars share one driving IC. When the LED lights on every two light bars share one driving IC, the MCU compares the respective brightness values of the LED lights on each same light bar with each other so as to obtain the maximum brightness value of the LED lights on the same light bar.

In S22, the maximum brightness values of the LED lights on two light bars that share one of the driving ICs are compared with one another. Then from among the maximum brightness values of the two light bars that share the one of the driving ICs the larger maximum brightness value is selected as the maximum brightness value of the LED lights in this one of the driving ICs, so as to obtain the maximum brightness value of the LED lights in each of the driving ICs.

Figure 7:
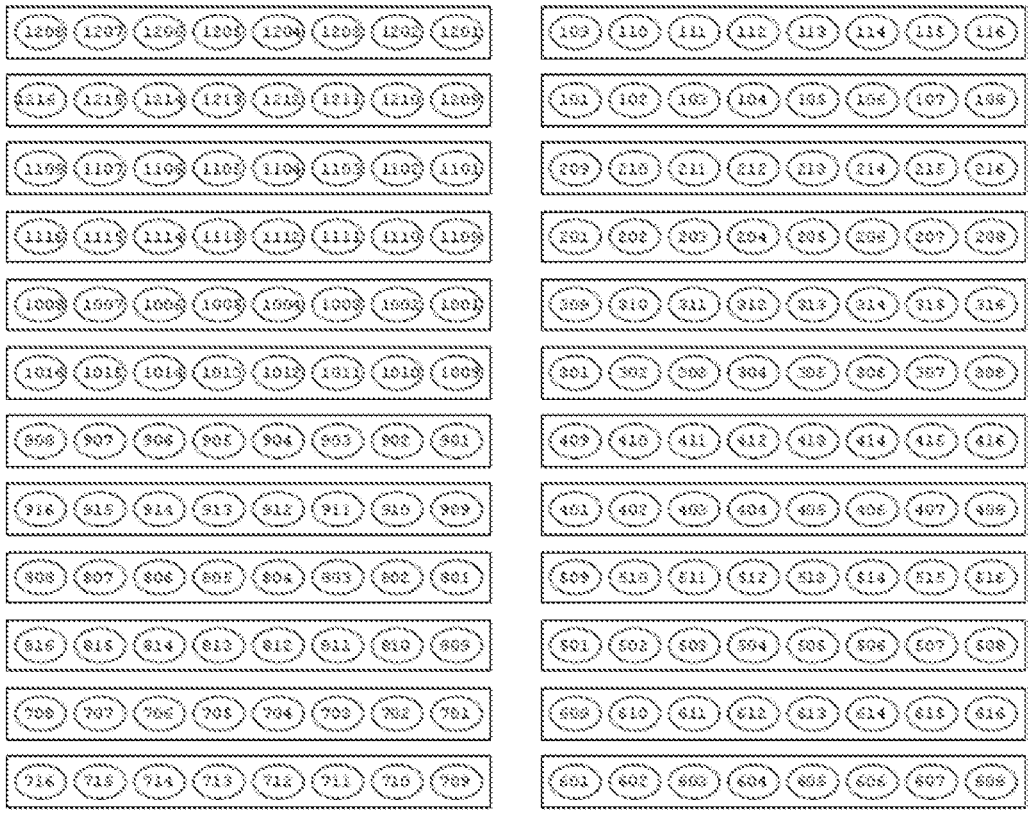
FIG. 7 is a schematic diagram illustrating an arrangement of LED lights in the LED backlight in accordance with an embodiment of this disclosure.

When it obtains the maximum brightness value of the LED lights on each light bar, the MCU would then compare the maximum brightness values of the LED lights on the two light bars on the driving IC with each other, and further takes the larger one in the maximum brightness values of the two light bars that share the driving IC as the maximum brightness value of the LED lights in this driving IC. Thus, the maximum brightness value of the LED lights in each of the driving ICs can be obtained in this way. Specifically, referring to FIG. 7, there is illustrated a schematic diagram of an arrangement of the LED lights in the LED backlight according to this disclosure. In FIG. 7, there are a total of 192 LED lights in the LED backlight. Every 8 LED lights share a light bar, and the 8 LED lights on a light bar common anode connect. One row uses 2 light bars, and so one row has 16 LED lights. The entire LED backlight has 12 rows of light bars. Every two light bars share a driving IC, where the driving IC may be shared by an upper and a lower light bar, or by a left and a right light bar. However, the arrangement of the LED lights in the LED backlight will not be limited to the arrangement shown in FIG. 7.

In this embodiment, by making the LED lights on two light bars share a driving IC, the driving ICs required for the LED backlight are saved, thereby saving the cost of the LED backlight source.

Figure 3:
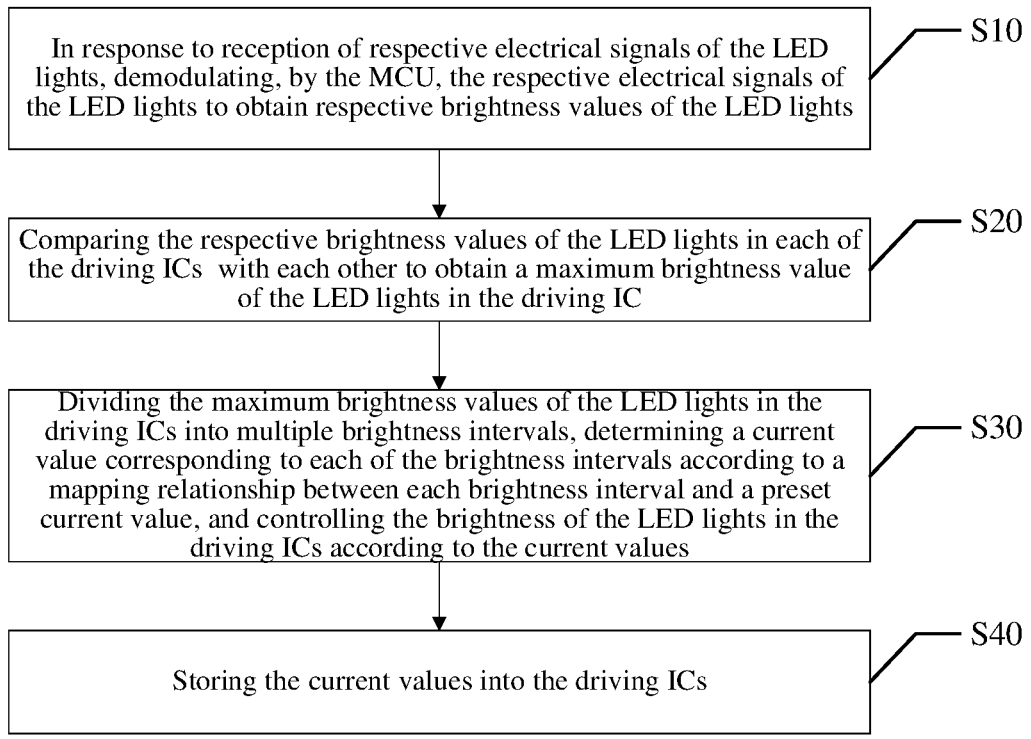
FIG. 3 is an illustrative flowchart of a second embodiment of the backlight driving control method in accordance with this disclosure.

As illustrated in FIG. 3, there is shown an illustrative flowchart of a second embodiment of the backlight driving control method in accordance with this disclosure. The second embodiment of the backlight driving control method according to this disclosure is provided based on the first embodiment of this disclosure.

In this embodiment, the backlight driving control method includes the following block S40.

In S40, the current values are stored into the driving ICs.

The MCU stores the current values to the registers of the driving ICs. When they receive the Local Dimming electrical signals of the picture to be displayed, the driving ICs control the brightness of the LED lights of the light bars connected to these driving ICs, so that the brightness of the LED lights would vary as the brightness of the displayed picture varies. As such, when the brightness of the displayed picture increases, the driving ICs would control the LED lights of the light bars connected to these driving ICs to brighten according to the current values. Otherwise when the brightness of the displayed picture decreases, the driving ICs would control the LED lights of the light bars connected to these driving ICs to dim according to the current values. The process of the driving ICs controlling the brightness of the LED lights of the light bars connected to these driving ICs to vary as the brightness of the displayed picture varies is completed during the period of elimination of visual retention of the LED display screen.

In this embodiment, the current values corresponding to different intervals are stored into the registers of the driving ICs, so that the driving ICs would control the brightness of the LED lights of the light bars connected to these driving ICs to vary as the brightness of the displayed picture varies, thereby improving the enery-saving effect of the LED backlight.

The present disclosure further provides a backlight driving control system.

Figure 4:
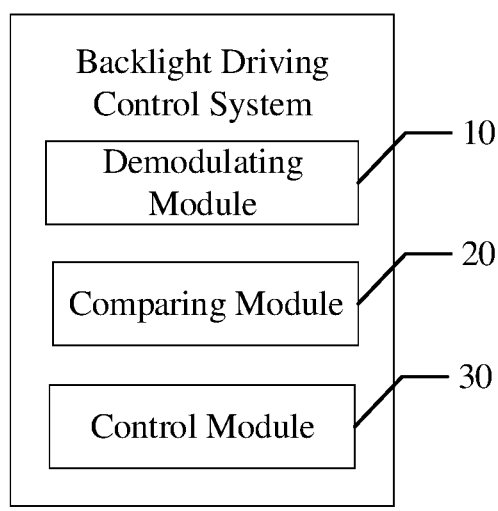
FIG. 4 is an illustrative block diagram of a first embodiment of a backlight driving control system in accordance with this disclosure.

As illustrated in FIG. 4, there is shown an illustrative block diagram of a first embodiment of a backlight driving control system in accordance with this disclosure.

The backlight driving control system is applied to a display terminal having a liquid crystal display. The display terminal includes a micro control unit (MCU) and a backlight. The backlight includes multiple light bars formed by LED lights as well as multiple driving ICs. The MCU is electrically connected to the driving ICs and is configured to send electrical signals to the driving ICs. Each driving IC controls one or more light bars. As illustrated in FIG. 8, there is shown a schematic diagram illustrating the structure of a Local Dimming driving board in accordance with an embodiment of this disclosure. As can be seen from FIG. 8, in the Local Dimming driving board, the MCU (Micro Control Unit, also called a single-chip microcomputer or an SCM) receives picture signals sent from the machine core board via the SPI (Serial Peripheral Interface) bus. When receiving the picture information, the MCU decodes the picture signals to obtain the light and dark configuration of the LED backlight, and the controls the state of each of the LED lights in each channel of the driving ICs. In this disclosure, the MCU is an LPC1113, but the MCU includes without limitation the LPC1113. The driving ICs are 16-channel, and the CH1-CH16 depicted in FIG. 8 represent the first channel through the sixteenth channel of a drive IC. Referring now to FIGS. 9 and 10, where FIG. 9 is a schematic graph illustrating a relationship between a forward voltage and forward current in accordance with an embodiment of this disclosure, while FIG. 10 is a schematic graph illustrating a relationship between a forward current and a brightness value of an LED light in accordance with an embodiment of this disclosure. As can be seen from FIG. 9 and FIG. 10, in this disclosure the forward current flowing in the local Dimming driving board increases as the forward voltage increases, and the brightness value of the LED lights in the Local Dimming driving board increases as the forward current increases.

In this embodiment, the backlight driving control system includes a demodulating module 10, a comparing module 20, and a control module 30.

The demodulating module 10 is configured to, in response to reception of respective electrical signals of the LED lights, demodulate the respective electrical signals of the LED lights to obtain respective brightness values of the LED lights.

For the present, almost all televisions use liquid crystal displays. The backlight of the liquid crystal display includes a light bar consisting of LED lights and multiple driving ICs. Each driving IC includes multiple LED lights. Further, one or more light bars share one driving IC. The liquid crystal display includes an MCU that demodulates the machine core board Local Dimming, as well as multiple driving ICs. The MCU-based Local Dimming is mainly composed of three parts, namely, an FPGA (Field Programmable Gate Array) or SOC (System On Chip), and LED driving ICs. When collecting the electrical signals for displaying a picture, the FPGA or the SOC sends the electrical signals to the MCU via the SPI (Serial Peripheral Interface), where the electrical signals are the respective PWM signals of the various LED lights in the LED backlight. Then in response to reception of the respective electrical signals of the various LED lights for displaying a picture, the MCU demodulates the respective electrical signals of the LED lights, namely demodulates the PWM signals, so as to obtain the respective PWM duty ratios of the LED lights. Based on the respective PWM duty ratios of the LED lights, the respective reference current values of the various LED lights in the LED backlight can be obtained; that is, the respective brightness values of the LED lights in the LED backlight source are obtained. The LED lights on each light bar in the LED backlight share one LED light driving IC, and the LED lights on the same light bar common anode connect. The driving IC for the LED lights is generally 8-channel or 16-channel. Each channel corresponds to an LED light, and the LED lights of the 8 channels or of the 16 channels are arranged together.

The comparing module 20 is configured to compare the respective brightness values of the LED lights in each of the driving ICs with each other to obtain the maximum brightness value of the LED lights in each of the driving ICs.

The MCU compares the respective brightness values of the LED lights in each of the driving ICs with each other, so as to obtain a maximum value of the brightness of the LED lights in the driving IC in the LED backlight. For example, when there are a total of 192 LED lights in the LED backlight, every 8 LED lights share a light bar, and the 8 LED lights on the same light bar common anode connect. When the driving ICs are 8-channel and one light bar uses one driving IC, then a total of 24 driving ICs would be required. The MCU compares the magnitudes of the brightness values of the 8 LED lights in each driving IC, and then takes the brightness value of the LED light with the largest brightness value in the same driving IC as the maximum brightness value of the LED lights in this driving IC, so as to obtain the maximum brightness value of the LED lights in each of the 24 driving ICs.

The control module 30 is configured to divide the maximum brightness values of the LED lights in the driving ICs into multiple brightness intervals, and determine a current value corresponding to each brightness interval according to a mapping relationship between each brightness interval and a preset current value, and then control the brightness of the LED lights in the driving ICs according to the current values.

When it obtains the maximum brightness value of the LED lights in every of the driving ICs in the LED backlight, the MCU arranges the maximum brightness values of the LED lights in these driving ICs from the smallest to the largest. Then based on the size conditions of the arranged maximum brightness value of the LED lights in every of the driving ICs, the MCU divides the maximum brightness values of the LED lights in these driving ICs into multiple brightness intervals. For example, when the maximum brightness values of the LED lights in these driving ICs are arranged relatively compact, the MCU may divide the maximum brightness values of the LED lights in these driving ICs into 3 brightness intervals. Otherwise when the maximum brightness values of the LED lights in these driving ICs are arranged relatively loose, the MCU may divide the maximum brightness values of the LED lights in these driving ICs into 5 brightness intervals. Then based on the mapping relationship between each brightness interval and a preset current value, the MCU determines the current value corresponding to each brightness interval, where the preset current values are current values corresponding to different brightness intervals that are pre-stored by the MCU. The current values and the brightness values of the brightness intervals are in a proportional relationship; that is, the greater the brightness values in a brightness interval, the larger the current value. As such, the MCU controls the brightness of the LED lights in the driving ICs according to the current values, namely controls the brightness of the LED lights in different driving ICs according to the current values of different brightness intervals For example, after it obtains the maximum brightness values of the LED lights in the 24 driving ICs, the MCU arranges the maximum brightness values of the LED lights in the 24 driving ICs in an ascending order, and then divides the maximum brightness values of the LED lights in the 24 driving ICs into 3 brightness intervals based on the arrangement result. That is, from among the maximum brightness values of the LED lights in the 24 driving ICs, a smallest, a middle, and a largest maximum brightness value are selected as boundary values of the brightness intervals, so as to obtain a first brightness interval, a second brightness interval, and a third brightness interval. The brightness value of the LED lights in the first brightness interval is smaller than the brightness value of the LED lights in the second brightness interval, and in turn the brightness value of the LED lights in the second brightness interval is smaller than the brightness value of the LED lights in the third brightness interval. Then based on a mapping relationship between each brightness interval and a preset current value, the MCU determines the current values corresponding to the first brightness interval, the second brightness interval, and the third brightness interval. The current value of the first brightness interval is smaller than the current value of the second brightness interval, and in turn the current value of the second brightness interval is smaller than the current value of the third brightness interval. As such, the MCU controls the brightness of the LED lights in these 24 driving ICs according to the current values of the first brightness interval, the second brightness interval, and the third brightness interval.

In the Local Dimming driving board, a backlight is composed of hundreds of LEDs. The backlight replaces a CCFL (Cold Cathode Fluorescent Lamp) backlight. The backlight LEDs can be adjusted according to the brightness of a picture, so that the brightness of highly bright portions of the displayed picture can reach the maximum, while the brightness of dark portions of the displayed picture can be reduced, or even turned off, in order to achieve the optimum contrast of the displayed picture. Accordingly, the reduction of the brightness of the dim areas reduces the power consumption of the backlight.

According to this embodiment, the respective brightness values of the LED lights are obtained based on the received respective electrical signals of the LED lights. Then the maximum brightness value of the LED lights in each driving IC is obtained based on the respective brightness values of the LED lights in the driving IC. The maximum brightness values of the LED lights in these driving ICs are then divided into brightness intervals, and the current values corresponding to these brightness intervals are then determined. Thus, the brightness of the LED lights in these driving ICs is then controlled according to these current values. Compared with the existing Local Dimming which adjusts the brightness by way of adjusting the PWM duty ratio and the LED reference current at the same time, the present disclosure adjusts the PWM duty ratio to adjust the LED reference current thus achieving the purpose of adjusting the brightness. Therefore, the energy-saving effect for the local dimming driving and the contrast of the picture display are improved without increasing the cost.

Figure 5:
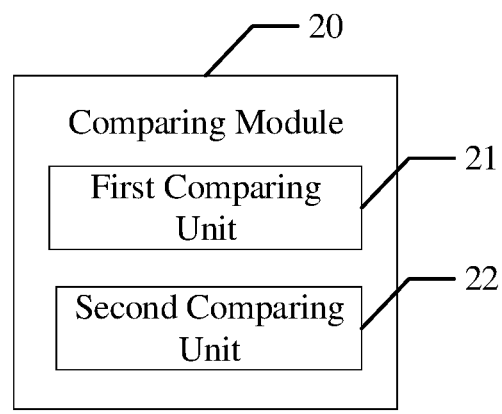
FIG. 5 is an illustrative block diagram of a comparing module in accordance with an embodiment of this disclosure.

Referring now to FIG. 5, there is shown an illustrative block diagram of a comparing module in accordance with an embodiment of this disclosure.

In this embodiment, the comparing module 20 includes a first comparing unit 21 and a second comparing unit 22.

The first comparing unit 21 is configured to compare the respective brightness values of the LED lights on each light bar with each other to obtain a maximum brightness value of the LED lights on the same light bar.

In this embodiment, the LED lights on every two light bars share one driving IC. When the LED lights on every two light bars share one driving IC, the MCU compares the respective brightness values of the LED lights on each same light bar with each other so as to obtain the maximum brightness value of the LED lights on the same light bar.

The second comparing unit 22 is configured to compare the maximum brightness values of the LED lights on two light bars that share one of the driving ICs with one another, select the larger maximum brightness value as the maximum brightness value of the LED lights in this one of the driving ICs from among the maximum brightness values of the two light bars that share the one of the driving ICs, so as to obtain the maximum brightness value of the LED lights in each of the driving ICs.

When it obtains the maximum brightness value of the LED lights on each light bar, the MCU would then compare the maximum brightness values of the LED lights on the two light bars on the driving IC with each other, and further takes the larger one in the maximum brightness values of the two light bars that share the driving IC as the maximum brightness value of the LED lights in this driving IC. Thus, the maximum brightness value of the LED lights in each of the driving ICs can be obtained in this way. Specifically, referring to FIG. 7, there is illustrated a schematic diagram of an arrangement of the LED lights in the LED backlight according to this disclosure. In FIG. 7, there are a total of 192 LED lights in the LED backlight. Every 8 LED lights share a light bar, and the 8 LED lights on the light bar common anode connect. One row uses 2 light bars, and so one row has 16 LED lights. The entire LED backlight has 12 rows of light bars. Every two light bars share a driving IC, where the driving IC may be shared by an upper and a lower light bar, or by a left and a right light bar. However, the arrangement of the LED lights in the LED backlight will not be limited to the arrangement shown in FIG. 7.

In this embodiment, by making the LED lights on two light bars share a driving IC, the driving ICs required for the LED backlight are saved, thereby saving the cost of the LED backlight source.

Figure 6:
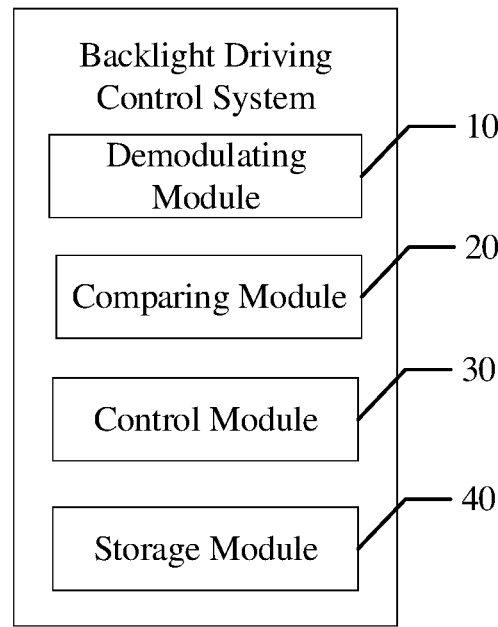
FIG. 6 is an illustrative block diagram of a second embodiment of the backlight driving control system in accordance with this disclosure.

As illustrated in FIG. 6, there is shown an illustrative flowchart of a second embodiment of the backlight driving control system in accordance with this disclosure. The second embodiment of the backlight driving control system according to this disclosure is provided based on the first embodiment of this disclosure.

In this embodiment, the backlight driving control system further includes a storage module 40, which is configured to store the current values into the driving ICs.

The MCU stores the current values to the registers of the driving ICs. When they receive the Local Dimming electrical signals of the picture to be displayed, the driving ICs control the brightness of the LED lights of the light bars connected to these driving ICs, so that the brightness of the LED lights would vary as the brightness of the displayed picture varies. As such, when the brightness of the displayed picture increases, the driving ICs would control the LED lights of the light bars connected to these driving ICs to brighten according to the current values. Otherwise when the brightness of the displayed picture decreases, the driving ICs would control the LED lights of the light bars connected to these driving ICs to dim according to the current values. The process of the driving ICs controlling the brightness of the LED lights of the light bars connected to these driving ICs to vary as the brightness of the displayed picture varies is completed during the period of elimination of visual retention of the LED display screen.

In this embodiment, the current values corresponding to different intervals are stored into the registers of the driving ICs, so that the driving ICs would control the brightness of the LED lights of the light bars connected to these driving ICs to vary as the brightness of the displayed picture varies, thereby improving the enery-saving effect of the LED backlight.

By the description of the forgoing embodiments, it is evident to those skilled in the art that the methods according to the foregoing embodiments can be implemented by means of software plus the necessary general-purpose hardware platform; these methods of course can also be implemented by hardware, but in many cases the former will be the more advantageous implementation. Based on such an understanding, the essential portions of the technical solutions according to this disclosure, or the portions that contribute to the prior art may be embodied as software products. Computer software products can be stored in a storage medium (e.g., a ROM/RAM, a magnetic disk, or an optical disk) and may include multiple instructions that when executed can cause a computing device (e.g., a mobile phone, a computer, a server, an air conditioner, or a network device) to perform the methods as described in the various embodiments according to the disclosure.

Furthermore, it will be apparent to those skilled in the art that this disclosure also provides a backlight driving control system, which includes a non-transitory program storage medium and one or more processors. The non-transitory program storage medium stores program code executable by the one or more processors to perform the various methods and processes described supra. In addition, it will be apparent to those skilled in the art that various modules or units 10, 20, 30, 40, 21, and 22 as illustrated in FIGS. 4 through 6 can be software modules or software units. In another aspect, it is well-known that various software modules or units inherently can be stored in the non-transitory program storage medium and executed by the one or more processors.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A backlight driving control method, being applied to a display terminal having a liquid crystal display, the display terminal comprising a MCU and a backlight, the backlight comprising a plurality of light bars formed by LED lights and a plurality of driving ICs, the MCU being electrically connected to the driving ICs and configured to send electrical signals to the driving ICs, each of the driving ICs controlling one or more light bars, the backlight driving control method comprising:

in response to reception of respective electrical signals of the LED lights, demodulating, by the MCU, the respective electrical signals of the LED lights to obtain respective brightness values of the LED lights;

comparing the respective brightness values of the LED lights in each of the driving ICs with each other to obtain a maximum brightness value of the LED lights in the driving IC;

dividing the maximum brightness values of the LED lights in the driving ICs into a plurality of brightness intervals, determining a current value corresponding to each of the brightness intervals according to a mapping relationship between each brightness interval and a preset current value, and controlling the brightness of the LED lights in the driving ICs according to the current values; and storing the current values in the driving ICs;

the LED lights on every two light bars sharing a driving IC;

wherein the block of comparing the respective brightness values of the LED lights in each of the driving ICs with each other to obtain a maximum brightness value of the LED lights in the driving IC comprises:

comparing the respective brightness values of the LED lights on each light bar with each other to obtain a maximum brightness value of the LED lights on the same light bar; and comparing the maximum brightness values of the LED lights on two light bars that share one of the driving ICs with each other, selecting the larger maximum brightness value as the maximum brightness value of the LED lights in the one of the driving ICs from among the maximum brightness values of the two light bars that share the one of the driving ICs, so as to obtain the maximum brightness value of the LED lights in each of the driving ICs.

2. The method of claim 1, wherein the LED lights on each same light bar common anode connect.

3. A backlight driving control method, being applied to a display terminal having a liquid crystal display, the display terminal comprising a MCU and a backlight, the backlight comprising a plurality of light bars formed by LED lights and a plurality of driving ICs, the MCU being electrically connected to the driving ICs and configured to send electrical signals to the driving ICs, each of the driving ICs controlling one or more light bars, the backlight driving control method comprising:

in response to reception of respective electrical signals of the LED lights, demodulating, by the MCU, the respective electrical signals of the LED lights to obtain respective brightness values of the LED lights;

comparing the respective brightness values of the LED lights in each of the driving ICs with each other to obtain a maximum brightness value of the LED lights in the driving IC; and dividing the maximum brightness values of the LED lights in the driving ICs into a plurality of brightness intervals, determining a current value corresponding to each of the brightness intervals according to a mapping relationship between each brightness interval and a preset current value, and controlling the brightness of the LED lights in the driving ICs according to the current values;

wherein the block of comparing the respective brightness values of the LED lights in each of the driving ICs with each other to obtain the maximum brightness value of the LED lights in the driving IC comprises:

comparing the respective brightness values of the LED lights on each light bar with each other to obtain a maximum brightness value of the LED lights on the same light bar, and comparing the maximum brightness values of the LED lights on two light bars that share one of the driving ICs with each other, selecting the larger maximum brightness value as the maximum brightness value of the LED lights in one of the driving ICs from among the maximum brightness values of the two light bars that share the one of the driving ICs, so as to obtain the maximum brightness value of the LED lights in each of the driving ICs.

4. The method of claim 3, wherein the LED lights on every two light bars share a driving IC.

5. The method of claim 4, wherein the LED lights on each same light bar common anode connect.

6. The method of claim 3, further comprising the following operation, subsequent to the block of dividing the maximum brightness values of the LED lights in the driving ICs into a plurality of brightness intervals, determining a current value corresponding to each of the brightness intervals according to a mapping relationship between each brightness interval and a preset current value, and controlling the brightness of the LED lights in the driving ICs according to the current values:

storing the current values in the driving ICs.

7. The method of claim 3, wherein the LED lights on each same light bar common anode connect.

8. A backlight driving control system, being applied to a display terminal having a liquid crystal display, the display terminal comprising a MCU and a backlight, the backlight comprising a plurality of light bars formed by LED lights and a plurality of driving ICs, the MCU being electrically connected to the driving ICs and configured to send electrical signals to the driving ICs, each of the driving ICs controlling one or more light bars, the backlight driving control system comprising one or more processors and a non-transitory program storage medium storing program code executable by the one or more processors, the program code comprising:

a demodulating module, configured to, in response to reception of respective electrical signals of the LED lights, demodulate the respective electrical signals of the LED lights to obtain respective brightness values of the LED lights;

a comparing module, configured to compare the respective brightness values of the LED lights in each of the driving ICs with each other to obtain a maximum brightness value of the LED lights in the driving IC; and a control module, configured to divide the maximum brightness values of the LED lights in the driving ICs into a plurality of brightness intervals, determine a current value corresponding to each of the brightness intervals according to a mapping relationship between each brightness interval and a preset current value, and control the brightness of the LED lights in the driving ICs according to the current values;

wherein the comparing module comprises:

a first comparing unit, configured to compare the respective brightness values of the LED lights on each light bar with each other to obtain a maximum brightness value of the LED lights on the same light bar; and a second comparing unit, configured to compare the maximum brightness values of the LED lights on two light bars that share one of the driving ICs with each other, select the larger maximum brightness value as the maximum brightness value of the LED lights in the one of the driving ICs from among the maximum brightness values of the two light bars that share the one of driving ICs, so as to obtain the maximum brightness value of the LED lights in each of the driving ICs.

9. The system of claim 8, wherein the LED lights on every two light bars share a driving IC.

10. The system of claim 9, wherein the LED lights on each same light bar common anode connect.

11. The system of claim 8, wherein the program code further comprises:

a storage module, configured to store the current values into the driving ICs.

12. The system of claim 8, wherein the LED lights on each same light bar common anode connect.

* * * * *